United States Patent [19]

Kessel et al.

[11] Patent Number: 5,050,658
[45] Date of Patent: Sep. 24, 1991

[54] PNEUMATIC VEHICLE TIRE

[75] Inventors: Stephan Kessel, Aachen; Karlheinz Evertz, Herzogenrath, both of Fed. Rep. of Germany

[73] Assignee: Uniroyal Englebert Reifen GmbH, Aachen, Fed. Rep. of Germany

[21] Appl. No.: 471,206

[22] Filed: Jan. 26, 1990

[30] Foreign Application Priority Data

Jan. 27, 1989 [DE] Fed. Rep. of Germany ....... 3902403

[51] Int. Cl.$^5$ .............................................. B60C 15/04
[52] U.S. Cl. .................................... 152/540; 152/380; 152/379.3; 152/379.5
[58] Field of Search ...................... 152/539, 540, 379.3, 152/379.5, 380, 516; 245/1.5

[56] References Cited

U.S. PATENT DOCUMENTS 1,503,883  8/1924  Cobb ............................... 152/540 X

FOREIGN PATENT DOCUMENTS 3618658  12/1987  Fed. Rep. of Germany ... 152/379.3

Primary Examiner—Michael W. Ball
Assistant Examiner—Nancy T. Krawczyk
Attorney, Agent, or Firm—Robert W. Becker & Associates

[57] ABSTRACT

A pneumatic vehicle tire for use on a one-piece wheel rim having radially inwardly disposed rim shoulders on which corresponding bead portions of the tire are mounted. The tire bead portions have bead rings that are formed of flat strips, whereby the longest dimension of the cross-sectional configuration of the flat strips is parallel to the direction of a run-flat force, thereby fixing the greatest angular impulse force parallel to the run-flat force. This reliably prevents the tire bead from being thrown from the rim, especially during emergency operation.

5 Claims, 1 Drawing Sheet

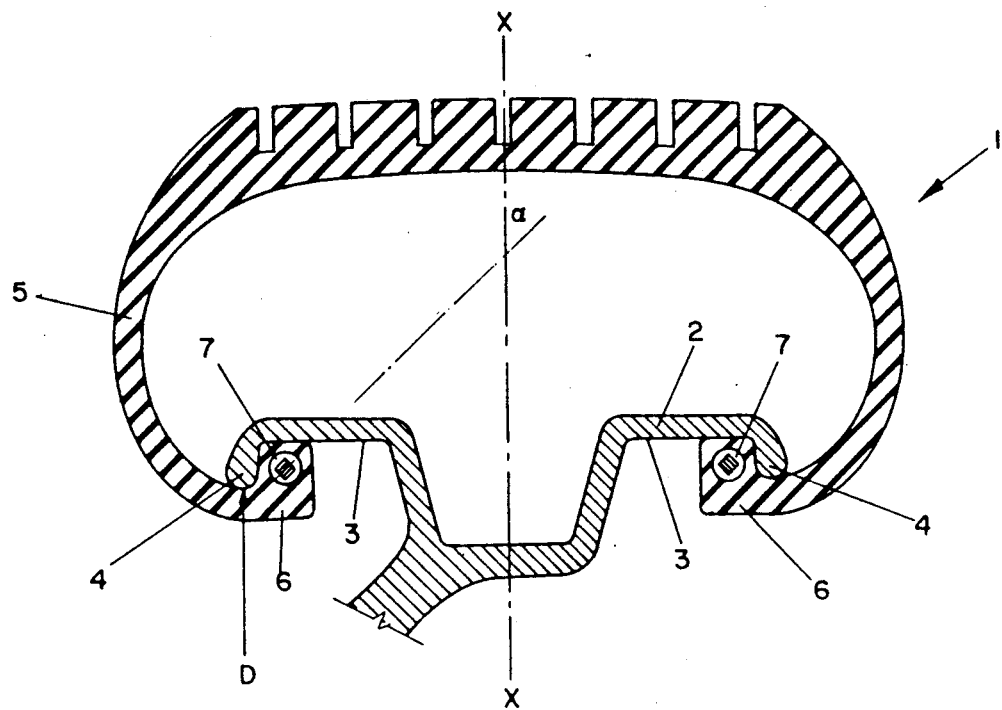
FIG—1
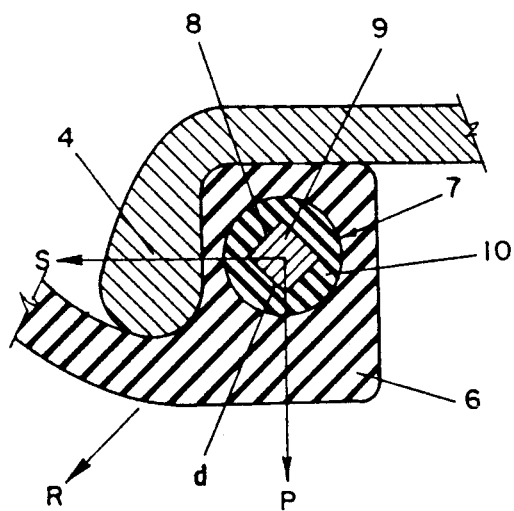
FIG—2
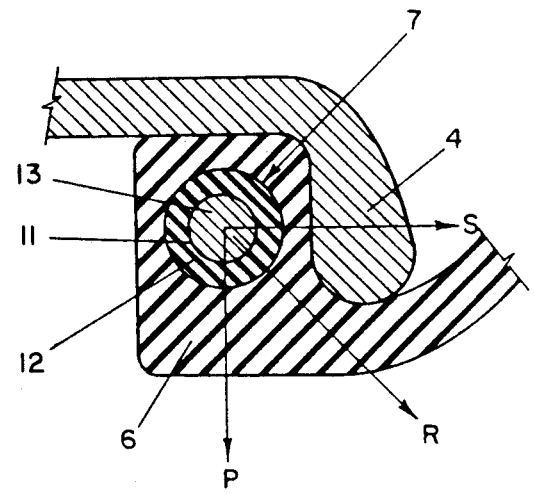
FIG—3

PNEUMATIC VEHICLE TIRE

BACKGROUND OF THE INVENTION

The present invention relates to a pneumatic vehicle tire for use on a one-piece wheel rim having radially inwardly disposed rim shoulders and radially inwardly extending rim flanges, with the pneumatic tire having bead portions that are mounted on the radially inner rim shoulders; each of the tire bead portions has a bead ring that is resistant to compression and bending, with the bead ring comprising a steel element core that is enveloped by a hard rubber coating that has a round cross-sectional configuration.

German patent application 3808278.0 discloses a tire bead core that comprises radially twisted metal wires having a cross-sectional orientation with a high angular impulse, whereby the width of the bore in basically the axial direction is the same as or greater than the height of the core in a radial direction. This known steel element core is enveloped by a hard rubber coating having a Shore A hardness of greater than 70° and also having a round shape. This known metal element core preferably has a hexagonal cross-sectional configuration.

It is an object of the present invention to further improve the known bead ring for the bead portion of a pneumatic vehicle tire with regard to a high angular impulse, and to dispose the steel elements of the core that are subjected to compression and bending forces in such a way that the resistance to these forces, which act upon the bead portion of the tire, is greatly increased without having to fear that the bead portion of the tire will be thrown from the rim during an emergency operation state, while the tire bead remains easy to mount.

BRIEF DESCRIPTION OF THE DRAWING

This object, and other objects and advantages of the present invention, will appear more clearly from the following specification in conjunction with the accompanying schematic drawing, in which:

FIG. 1 is a cross-sectional view through the inventive vehicle wheel and tire assembly;

FIG. 2 is an enlarged cross-sectional view of one exemplary embodiment of the inventive bead ring; and FIG. 3 is an enlarged cross-sectional view of a further exemplary embodiment of the inventive bead ring.

SUMMARY OF THE INVENTION

The pneumatic vehicle tire of the present invention is characterized primarily in that the element core of a bead ring is formed of known flat strips. Bead rings of band steel are known in conventional tire bead portions (German Offenlegungsschrift 29 40 221 and French application 72 16 992).

By using a flat strip bead core in the bead ring of a bead portion of a tire that is mounted on a wheel rim having radially inwardly disposed rim shoulders, the arrangement of the flat strips in and parallel to the direction of the resultant force provides a relatively high angular impulse merely from the orientation of the flat strips. This assures that when great forces are encountered, especially during a flat-tire operation, the tire bead will reliably withstand the compression and bending forces that act upon it, so that the tire bead will not be pressed off over the rim flange.

The flat strips are preferably made of band steel and are disposed at an angle relative to the central plane of the tire at an angle of 30° to 60° that is inclined outwardly relative to the axis of the tire; the flat strips are embodied as a unit, with the strips either being cramped or spot welded. This strip steel core is enveloped by a hard rubber coating or casing and, via a preheating operation, is already provided as a prefabricated tire component. The round external shape of the bead ring is necessary for mounting or removal of the bead portion of the tire from a rim, so that the bead ring can turn relative to the material of the tire bead portion that surrounds it when it is necessary to overcome the narrow location on the rim flange during the mounting procedure.

Pursuant to another specific embodiment of the present invention, the bead core unit itself can have a round shape and be enveloped by a hard rubber member. Band steel cores are more economical than the known conventional twisted bead core rings due to the commercial availability of the material and due to an advantageous manufacture.

Further specific features of the present invention will be described in detail subsequently.

DESCRIPTION OF THE PREFERRED EMBODIMENTS

Referring now to the drawing in detail, FIG. 1 shows a vehicle wheel and tire combination or assembly 1 that includes a one-piece wheel rim 2 which is provided with radially inwardly disposed rim shoulders 3 and radially inwardly extending rim flanges 4. The pneumatic vehicle tire 5 is provided with bead portions 6 that are mounted on the rim shoulders 3. The rim flanges 4 prevent the bead portions 6 of the tire from being thrown from the rim. Each of the bead portions 6 is provided with a bead ring 7 that is comprised of a bead core 8, which is formed from flat strips 9, preferably of band steel, which are enveloped by a rubber coating 10.

In the embodiment illustrated in FIG. 2, the bead ring 7 is formed of several layers of flat strips 9 that then have an essentially rectangular cross-sectional configuration.

The flat strips 9 are disposed at an angle α relative to the central plane x—x of the tire. The longest dimension of the cross-sectional configuration of the flat strips 9 is in the position of the greatest angular impulse, which is essentially disposed in the direction of the force component or resultant force R that is effective upon the tire bead. The reference symbol S indicates a lateral force, and the reference symbol P represents a compressive force, which forces act upon the tire bead.

The bead ring 7, which is comprised of the band steel core elements, is enveloped by a hard rubber coating 10. Externally, this rubber coating 10 has a round shape so that the bead ring is able to turn relative to the bead portion of the tire. The hard rubber coating is produced by preheating polymerizable rubber material having a high hardness.

FIG. 3 illustrates an exemplary embodiment in which the band steel member 11 is formed of flat strips 13 that together have an externally round shape. This round strip core is enveloped by a hard rubber member 12, thereby retaining the advantageous round shape of the bead ring. This round core can be installed without a preheating operation. The flat strips can be disposed in layers to form a core, or can be wound to form a core unit, before they are enveloped with the hard rubber coating material. Band steel is more economical than the conventional twisted wire bead cores because the band steel material and the production of the bead core are more advantageous.

With regard to the specific arrangement of the steel element core 8 or 11, the most radially inward edge of the steel element core (see "d") is disposed radially outwardly of the inner diameter D of the rim flange 4.

The present invention is, of course, in no way restricted to the specific disclosure of the specification and drawing, but also encompasses any modifications within the scope of the appended claims.

What we claim is:

1. In a pneumatic vehicle tire mounted on a one-piece wheel rim having radially inwardly disposed rim shoulders which are adjoined axially outwardly by essentially radially inwardly extending rim flanges for holding inverted bead portions of said tire on said rim shoulders, with each of said tire bead portions having a bead ring that is resistant to compression and bending, whereby said bead ring comprises a steel element core that is enveloped by a hard rubber coating that has a round cross-sectional configuration, the improvement wherein:

said steel element core is formed of flat strips, whereby the longest dimension of the cross-sectional configuration of said flat strips is disposed in and parallel to the direction of a run-flat force that acts upon that bead portion.

2. A pneumatic vehicle tire according to claim 1, in which said flat strips are disposed at an angle of 30° to 60° relative to a central plane of said tire; and in which the most radially inward edge of said steel element core is disposed radially outwardly of the inner diameter of said rim flange.

3. A pneumatic vehicle tire according to claim 2, in which said steel element core comprises a plurality of fixedly interconnected flat strips.

4. A pneumatic vehicle tire according to claim 3, in which said steel element core has a rectangular cross-sectional configuration.

5. A pneumatic vehicle tire according to claim 3, in which said steel element core has a round external cross-sectional configuration.

* * * * *